(12) United States Patent
Katsumata

(10) Patent No.: US 6,430,221 B1
(45) Date of Patent: Aug. 6, 2002

(54) TRANSMITTER, RECEIVER, TRANSMITTING METHOD AND RECEIVING METHOD

(75) Inventor: Toru Katsumata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/392,078

(22) Filed: Sep. 8, 1999

(30) Foreign Application Priority Data

Sep. 9, 1998 (JP) .......................................... 10-255425

(51) Int. Cl.[7] ................................................ H04N 7/12
(52) U.S. Cl. .............................. 375/240.01; 348/14.01; 348/14.13
(58) Field of Search ......................... 341/51; 348/14.01, 348/14.02, 14.08, 14.09, 14.13, 568, 700; 370/535; 375/240.01, 240.03, 240.12, 240.18; 382/232, 240; H04N 7/12

(56) References Cited

U.S. PATENT DOCUMENTS

| | | | | |
|---|---|---|---|---|
| 5,594,736 A | * | 1/1997 | Tatsumi et al. | 370/535 |
| 5,654,702 A | * | 8/1997 | Ran | 341/51 |
| 5,724,451 A | * | 3/1998 | Shin et al. | 382/240 |
| 5,815,217 A | * | 9/1998 | Kumazawa et al. | 348/700 |
| 5,835,129 A | * | 11/1998 | Kumar | 348/14.09 |
| 5,914,728 A | * | 6/1999 | Yamagishi et al. | 348/568 |
| 6,249,617 B1 | * | 6/2001 | Chen | 382/232 |
| 6,313,863 B1 | * | 11/2001 | Chida | 348/14.01 |

* cited by examiner

Primary Examiner—Richard Lee
(74) Attorney, Agent, or Firm—Crosby, Heafey, Roach & May

(57) ABSTRACT

A transmitter, a receiver, a transmitting method, and a receiving method which make it possible to transmit or receive moving image data with higher resolution than specified by the prescribed coding and decoding modes. A split moving image data is obtained by dividing a second moving image data for one frame in a second image format in accordance with an image size in a first image format and the dummy moving image data in the first image format are sequentially and alternately coded and transmitted. The split moving image data and the dummy moving image data which have been coded and transmitted are then received and decoded. The split moving image data which has been obtained is then selectively used to reproduce second moving image data. Thus, it is possible to provide a transmitter, a receiver, a transmitting method, and a receiving method which make it easy to transmit and receive the moving image data without converting the format of the second moving image data and the moving image data has a higher resolution than that of the moving image data specified by prescribed coding and decoding modes.

14 Claims, 8 Drawing Sheets

TRANSMITTER, RECEIVER, TRANSMITTING METHOD AND RECEIVING METHOD

BACKGROUND OF THE INVENTION

1. Field of the Invention

This invention relates to a transmitter, a receiver, a transmitting method and a receiving method, and more particularly, is suitably applied to, for instance, the terminal units of a video conference system.

2. Description of the Related Art

In a video conference system, a plurality of terminal units is provided at a number of spots and connected together through public network. Moving image data and audio data are transmitted and received among those terminal units so that a conference can be carried out by employing moving images on the basis of the moving image data and sound on the basis of the audio data.

In practice, in a video conference system, the moving image data and the audio data to be transmitted in each terminal unit are subjected to coding processing in accordance with applied prescribed coding modes. The obtained coded moving image data and the coded audio data are transmitted to other terminal units through public network. The terminal unit which receives these coded moving image data and coded audio data performs decoding processing on them in accordance with proper decoding modes, so that original moving image data and audio data can be obtained.

In this case, for some of such video conference systems, coding and decoding modes of the moving image data standardized on the basis of an advice called "H. 261" by the international telecommunication union-telecommunication standardization sector (ITU-T) are applied to each terminal unit.

The video conference system with the above-described configuration is so defined as to code the moving image data in a first image format called a common intermediate format (CIF) of 352 pixels in the horizontal direction and 288 lines in the vertical direction on the basis of the "H. 261."

Therefore, in the video conference system with the above-described configuration, even in the case that each terminal unit is installed in a country where a television system such as the national television system committee (NTSC) system (720 pixels in the horizontal direction and 240 lines in the vertical direction) and the phase alternation by line (PAL) system (720 pixels in the horizontal direction and 288 lines in the vertical direction)to which a different image format is applied is adopted, the image format of moving image data formed in accordance with this television system is converted into the first image format, then, the moving image data with its converted image format is subjected to coding processing and the obtained coded moving image data is transmitted to other terminal units through public network.

Further, in the video conference system, the above coded moving image data is subjected to decoding processing in the terminal unit which receives the coded moving image data, then, the first image format thereof is converted into the image format of a relevant television system. In this way, the moving image data can be transmitted and received irrespective of the television system.

In the video conference system with such a configuration, however, since the image format of the moving image data having relatively high resolution which is formed on the basis of a prescribed television system is converted into the first image format upon transmission of data, the resolution for this moving image data lowers. As a consequence, even if it is desired to transmit and receive the moving image data corresponding to the moving image with high resolution, it is impossible to meet this demand.

As a kind of these video conference systems known in the art, coding and decoding modes standardized in accordance with an advice called "H. 261 Annex D" on the basis of the "H. 261" by the ITU-T are applied to each terminal unit.

The video conference system with the above-mentioned configuration is so defined as to transmit and receive still image data corresponding to the still image in an image format (referred to as a second image format, hereinafter) four times (704 pixels in the horizontal direction and 576 lines in the vertical direction) as high as the first image format as well as to transmit and receive the moving image data in the first image format.

Actually, in the video conference system with the above configuration, each terminal unit is designed to divide, upon transmission of the still image data, the still image data into four pieces of first to fourth still image data having an image size which corresponds to that in the first image format (referred to as first to fourth split still image data, hereinafter), then sequentially apply coding processing thereto, and transmit the obtained first to fourth coded split still image data, and to apply, upon receiving the still image data, decoding processing to the first to fourth received split still image data and reproduce original still image data on the basis of the obtained first to fourth split still image data.

Therefore, while it has recently been considered in the video conference system with the above configuration that the moving image data in the second image format corresponding to moving images having higher resolution is transmitted and received under the transmitting and receiving processing of the still image data, it is difficult to transmit and receive the moving image data in the second image format, because the "H. 261 Annex D" specifies that the still image data (composed of one frame) must not be transmitted successively for two frames or more.

SUMMARY OF THE INVENTION

In view of the foregoing, an object of the present invention is to provide a transmitter, a receiver, a transmitting method and a receiving method which are capable of transmitting and receiving moving image data with higher resolution than that of moving image data which is specified by prescribed coding and decoding modes.

The foregoing object and other objects of the invention have been achieved by the provision of a transmitter for coding the first moving image data in a prescribed first image format with a prescribed coding mode and transmitting the coded moving image data, dividing the still image data of a second image format having a larger image size than that in the first image format into a plurality of split still image data with an image size corresponding to that in the first image format, and then, subjecting the split still image data to the coding processing and transmitting the coded split still image data. The transmitter comprises:

moving image data dividing means for sequentially dividing the second moving image data in the second image format into a plurality of split moving image data with an image size corresponding to that in the first. image format on the basis of unit of frame, and sequentially and alternately outputting the split moving image data for one frame out of the second moving image data and the dummy moving image data for at least one frame with an image size corresponding to that in the first image format; and coding means for coding the split moving image data and the dummy moving image data outputted from the moving image data dividing unit.

As a result, the second moving image data can be transmitted with ease in accordance with the prescribed coding mode without converting the second image format of the second moving image data into the first image format.

Further, according to the present invention, there is provided a receiver for receiving and decoding with a relevant decoding mode first moving image data and each split still image data coded by and transmitted from the transmitter which codes and transmits the first moving image in a prescribed first image format with a prescribed coding mode, divides still image data in a second image format having a larger image size than that in the first image format into a plurality of split still image data with an image size corresponding to that in the first image format, subjects split still image data to coding processing and transmits coded split still image data. The receiver comprises: receiving means for receiving split moving image data and dummy moving image data, which are obtained after second moving image data in the second image format is sequentially divided on the basis of unit of frame into a plurality of split moving image data with an image size corresponding to that in the first image format, and the split moving image data for one frame out of the second moving image data for at least one frame with an image size corresponding to that in the first image format are sequentially and alternately coded by and transmitted from the transmitter; decoding means for decoding each coded split moving image data and the dummy moving image data which are coded and received by the receiving unit and alternately outputting in sequence each split moving image data and the dummy moving image data which are thus obtained; moving image data integrating means for selectively using and integrating the split moving image data of the split moving image data and the dummy moving image data which are outputted from the decoding unit to reproduce the second moving image data.

As a consequence, the second moving image data transmitted from the transmitter in accordance with the prescribed coding mode without converting the second image format into the first image format can be received and processed with ease.

Further, according to the present invention, there is provided a transmitting method for coding the first moving image data in a prescribed first image format with a prescribed coding mode and transmitting the coded moving image data, dividing the still image data in a second image format having a larger image size than that in the first image format into a plurality of split still image data with an image size corresponding to that in the first image format, and then, subjecting the split still image data to the coding processing and transmitting the coded split still image data. The transmitting method comprises: a first step of sequentially dividing the second moving image data in the second image format into a plurality of split moving image data with an image size corresponding to that in the first image format on the basis of unit of frame, and alternately outputting in sequence each split moving image data for one frame out of the second moving image data and the dummy moving image data for at least one frame with an image size corresponding to that in the first image format; and a second step of coding each split moving image data and the dummy moving image data outputted in the first step.

Consequently, the second moving image data can easily be transmitted in accordance with the prescribed coding mode without converting the second image format of the second moving image data into the first image format.

Further, according to the present invention, there is provided a receiving method for receiving and decoding with a relevant decoding mode first moving image data and each split still image data coded by and transmitted from the transmitter which codes and transmits the first moving image in a prescribed first image format with a prescribed coding mode, divides still image data in a second image format having a larger image size than that in the first image format into a plurality of split still image data with an image size corresponding to that in the first image format, subjects split still image data to coding processing and transmits coded split still image data. This receiving method comprises: a first step of receiving split moving image data and dummy moving image data, which are obtained after second moving image data in the second image format is sequentially divided on the basis of unit of frame into a plurality of split moving image data with an image size corresponding to that in the first image format, and the split moving image data for one frame out of the second moving image data for at least one frame with an image size corresponding to that in the first image format are sequentially and alternately coded by and transmitted from the transmitter; a second step of applying the decoding processing to each coded split moving image data and the coded dummy moving image data that are received in the first step and alternately outputting in sequence each split moving image data and the dummy moving image data which are thus obtained; and a third step of selectively using and integrating the split moving image data from the split moving image data and the dummy moving image data which are outputted in the second step so as to reproduce the second moving image data.

As a result, the second moving image data transmitted from the transmitter in accordance with the prescribed coding mode without converting the second image format into the first image format can be received and processed with ease.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiment of this invention will be described with reference to the accompanying drawings:

(1) Configuration of Video Conference System According to This Embodiment

Figure 1:
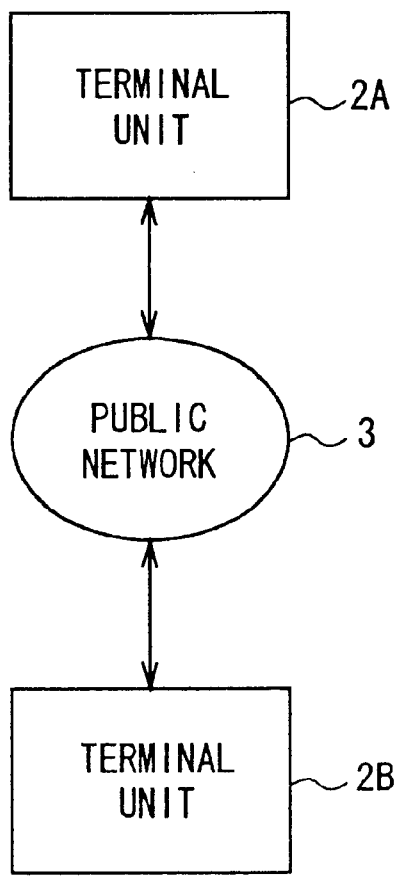
FIG. 1 is a block diagram showing one embodiment of the entire configuration of a video conference system according to the present invention.

Referring to FIG. 1, reference numeral 1 entirely denotes a video conference system to which the present invention is applied. For instance, two terminal units 2A and 2B are connected together via a public network 3.

Figure 2:
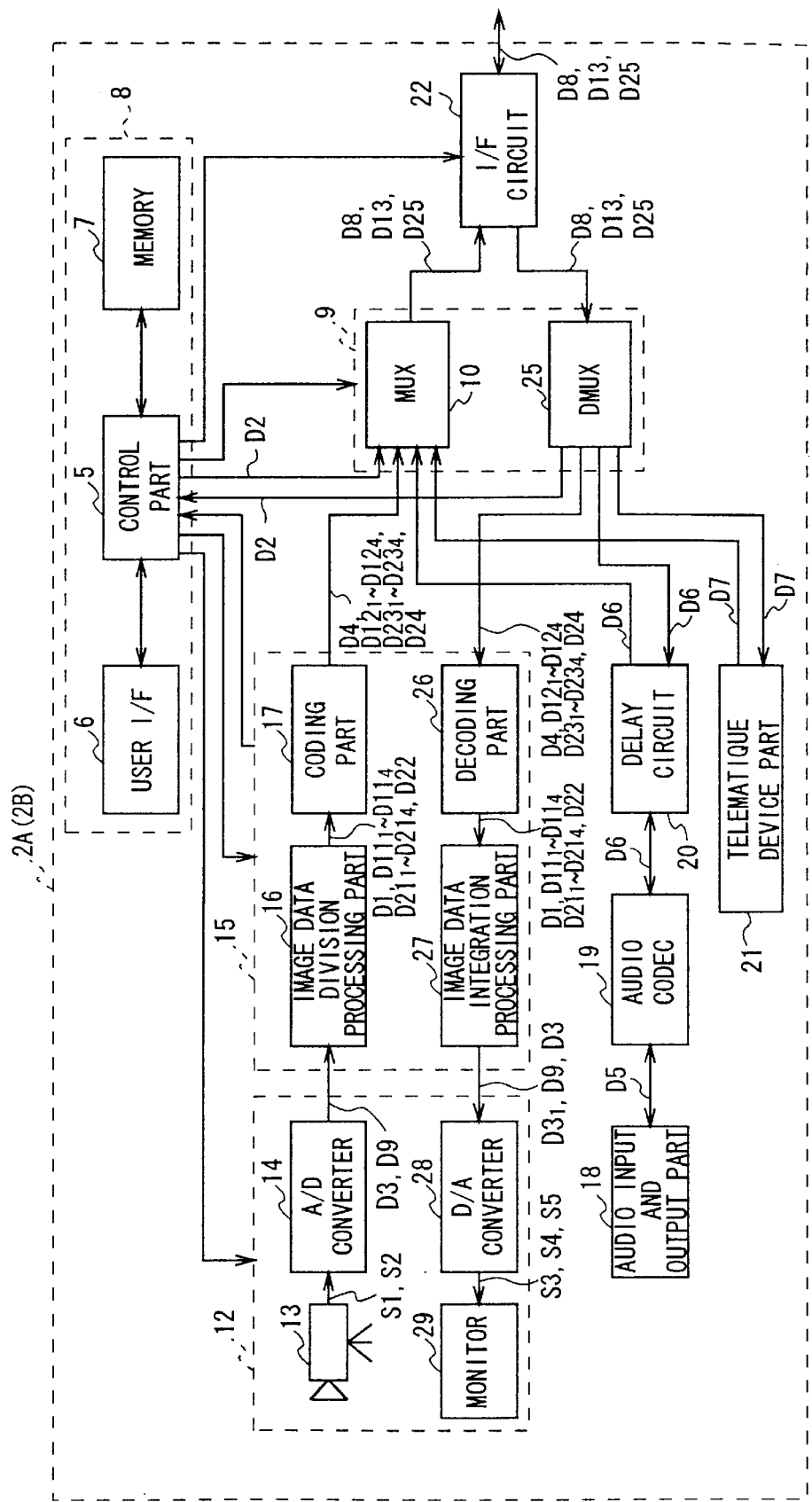
FIG. 2 is a block diagram of the circuit configuration of a terminal unit.

In this case, as shown in FIG. 2, the terminal units 2A and 2B have the same configuration. As coding and decoding modes for moving image data and still image data, the coding and decoding modes standardized on the basis of "H. 261 Annex D" are applied to the terminal units 2A and 2B.

Each of the terminal units 2A and 2B is provided with a system control device part 8 comprised of a control part 5, a user interface 6 such as a keyboard for inputting various kinds of control information and a nonvolatile memory 7 in which a prescribed program for operating the terminal units 2A and 2B is previously stored. The control part 5 starts the program in the memory 7 on the basis of various kinds of control information inputted through the user interface 6, so that the corresponding terminal units 2A and 2B are entirely controlled on the basis of the started program.

In this connection, the control part 5 in each terminal unit 2A, 2B shifts into a first transmission processing mode, upon transmission of data, when a transmission request information for the first moving image data D1 in a first image format is inputted through the user interface 6, and then transmits first transmission processing mode information indicating the execution of the first transmission processing mode to the multiplexer 10 in a data multiplex/separation part 9 as control data D2.

At this time, in an image input and output part 12, a subject (not shown) is shot by a television camera 13, so that an analog moving image signal S1 in an image format (referred to as a third image format, hereinafter) whose image size is larger than that in a second image format is formed and it is subjected to analog/digital conversion processing by an analog/digital converter 14 to obtain the second digital moving image data D3 in the second image format. The second moving image data D3 is transmitted to the image data division processing part 16 of an image codec 15.

The image data division processing part 16 converts the second image format of the second moving image data D3 supplied from the analog/digital converter 14 into the first image format and sequentially transmits the obtained first moving image data D1 to a coding part 17 on the basis of unit of a frame.

The coding part 17 applies coding processing to the first moving image data D1 supplied from the image data division processing part 16 in accordance with the coding mode standardized on the basis of the "H. 261 Annex D" and transmits the coded moving image data D4 thus obtained to the multiplexer 10.

Further, an audio input and output part 18 applies analog/digital conversion processing to an analog audio signal to be transmitted which is got by collecting sound in the periphery through, for instance, a microphone (not shown) and sends the obtained digital audio data D5 to an audio codec 19.

The audio code 19 applies coding processing to the audio data D5 supplied from the audio input and output part 18 in accordance with a prescribed coding mode, delays the obtained coded audio data D6 by prescribed time through a delay circuit 20 and transmits the delayed audio data to the multiplexer 10.

Further, a telematique device part 21 transmits prescribed information data D7 for data communication which is created by, for instance, a personal computer (not shown) to the multiplexer 10 as required.

Thereby, the multiplexer 10 time-division multiplexes the control data D2 supplied from the control part 5, the coded moving image data D4 supplied from the coding part 17, the coded audio data D6 supplied through the delay circuit 20 and further the information data D7 supplied from the telematique device 21 when necessary to transmit the obtained multiplexed data D8 to the other terminal unit 2A or 2B sequentially through an interface circuit 22 and public network 3.

The control part 5 of each terminal unit 2A, 2B shifts into a second transmission processing mode when a transmission request information for the still image data D9 in the second image format is inputted through the user interface 6, and transmits second transmission processing mode information indicating that the second transmission processing mode is executed to the multiplexer 10 as control data D10.

At this time, in the image input and output part 12, the subject is shot by the television camera 13 so that an analog still image signal S2 corresponding to the still image (one frame) in the third image format is formed and it is subjected to analog/digital conversion processing by the analog/digital converter 14. Thus, the obtained digital still image data D9 in the second image format is transmitted to the image data division processing part 16.

In the image data division processing part 16, the still image data D9 in the second image format is divided into four pieces of first to fourth split still image data $D11_1$ to $D11_4$ with an image size corresponding to that in the first image format and these first to fourth split still image data $D11_1$ to $D11_4$ are sequentially transmitted to the coding part 17.

The coding part 17 applies the coding processing to the first to fourth split still image data $D11_1$ to $D11_4$ sequentially supplied from the image data division processing part 16 in accordance with the coding mode standardized on the basis of the "H. 261 Annex D," as mentioned above, and sends the obtained first to fourth coded split still image data $D12_1$ to $D12_4$ to the multiplexer 10.

Then, the multiplexer 10 is supplied with the coded audio data D6 through the delay circuit 20 at this time as described above, and is supplied with the information data D7 from the telematique device part 21 if necessary. Thus, obtained control data D10 supplied from the control part 5, the first to fourth coded split still image data $D12_1$ to $D12_4$ supplied from the coding part 17, the coded audio data D6 and the information data D7 are sequentially time-division multiplexed. Thus, the obtained multiplexed data D13 is transmitted to the other terminal unit 2A or 2B sequentially through the interface circuit 22 and the public network 3.

On the other hand, in each terminal unit 2A, 2B, the multiplexed data D8 and D13 sent through the public network 3 from the other terminal unit 2A or 2B, upon receiving the data, are received by a demultiplexer 25 through the interface circuit 22.

The demultiplexer 25 separates the received multiplexed data D8 and D13 into the control data D2 and D10, the coded moving image data D4 and the first to fourth coded split still image data $D12_1$ to $D12_4$, the coded audio data D6 and the information data D7, transmits the control data D2 and D10 to the control part 5, sends the coded moving image data D4 and the first to fourth coded split still image data $D12_1$ to $D12_4$ to a decoding part 26, and transmits the coded audio data D6 to the audio codec 19 through the delay circuit 20 and the information data D7 to the telematique device part 21.

In this instance, when the control data D2 is supplied from the demultiplexer 25, the control part 5 shifts into a first reception processing mode in accordance with the first transmission processing mode information which is obtained on the basis of the control data D2 and controls entirely the corresponding terminal unit 2A or 2B based on the first reception processing mode.

Then, the decoding part 26 decodes the coded moving image data D4 supplied from the demultiplexer 25 at this time in accordance with a relevant decoding mode so that it transmits the obtained first moving image data D1 to an image data integration processing part 27.

The image data integration processing part 27 converts the first image format of the first moving image data D1 supplied from the decoding part 26 into the second image format and transmits the obtained second moving image data $D3_1$ to the image input and output part 12.

In the image input and output part 12, the second moving image data $D3_1$ supplied from the image data integration processing part 27 is subjected to digital/analog conversion processing through a digital/analog converter 28 and the obtained analog moving image signal S3 is transmitted to a monitor 29. Thus, a moving image on the basis of the moving image signal S3 is displayed on the monitor 29.

Further, the audio codec 19 applies decoding processing to the coded audio data D6 supplied from the demultiplexer 25 through the delay circuit 20 in accordance with a prescribed relevant decoding mode and transmits the obtained audio data D5 to the audio input and output part 18.

The audio input and output part 18 applies digital/analog conversion processing to the audio data D5 supplied from the audio codec 19 and transmits the obtained analog audio signal to, for example, speakers (not shown) to make sound based on the audio signal out of the speakers.

Further, the telematique device part 21 takes the information data D7 supplied from the demultiplexer 25 into, for instance, a personal computer and displays the information based on information data D7 on the monitor of the personal computer.

When the control data D10 is supplied from the demultiplexer to the control part 5, the control part 5 shifts into a second reception processing mode corresponding to second transmission processing mode information which is obtained on the basis of the control data D10 and controls completely the corresponding terminal unit 2A or 2B in accordance with the second reception processing mode.

Then, the decoding part 26 decodes the first to fourth coded split still image data $D12_1$ to $D12_4$ sequentially supplied from the demultiplexer 25 at this time in accordance with a relevant decoding mode and transmits the obtained first to fourth split still image data $D11_1$ to $D11_4$ to the image data integration processing part 27.

The image data integration processing part 27 integrates the first to fourth split still image data $D11_1$ to $D11_4$ supplied from the decoding part 26 to reproduce the still image data D9 in the original second image format and then transmits the reproduced still image data D9 to the image input and output part 12.

In the image input and output part 12, the still image data D9 supplied from the image data integration processing part 27 undergoes digital/analog conversion processing by means of the digital/analog converter 28 and the obtained analog still image signal S4 is transmitted to the monitor 29. Thus, a still image based on the still image signal S4 is displayed on the monitor 29.

In this connection, at this time, the audio codec 19, the audio input and output part 18 and the telematique device part 21 respectively operate in a similar manner to that at the time in the above described first reception processing mode.

As described above, in the video conference system 1, the first moving image data D1 and the still image data D9 can be transmitted and received between the terminal units 2A and 2B.

(2) Detail Configuration of Image Data Division Processing Part

Figure 3:
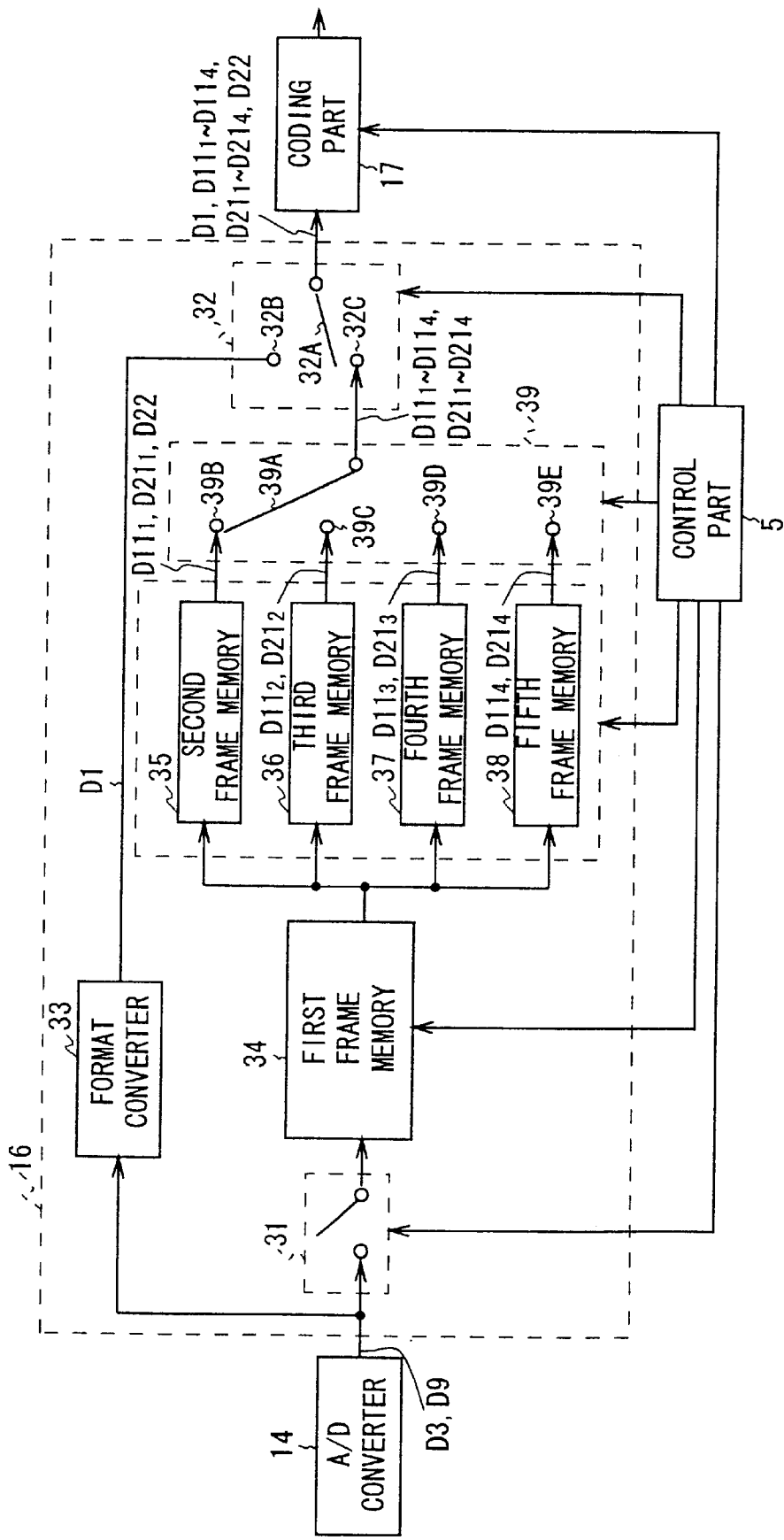
FIG. 3 is a block diagram showing the circuit configuration of an image data division processing part.

Actually, in the image data division processing part 16, in the first transmission processing mode, a first switching unit 31 is switched into an off state under the control of the control part 5, and the switch 32A of a second switching unit 32 is connected to a first contact 32B, as shown in FIG. 3.

Accordingly, in the image data division processing part 16, the second moving image data D3 supplied from the analog/digital converter 14 is taken into a format converter 33 by which the second image format of the second moving image data D3 is converted into the first image format and the obtained first moving image data D1 is sequentially transmitted to the coding part 17 through the second switching unit 32.

Further, in the image data division processing part 16, in the second transmission processing mode, the first switching unit 31 is switched into an on state under the control of the control part 5 and the switch 32A of the second switching unit 32 is connected to a second contact 32C.

In the image data division processing part 16 under this state, the still image data D9 supplied from the analog/digital converter 14 is taken and written in a first frame memory 34 having a storage capacity corresponding to the second image format through the first switching unit 31.

Figure 4:
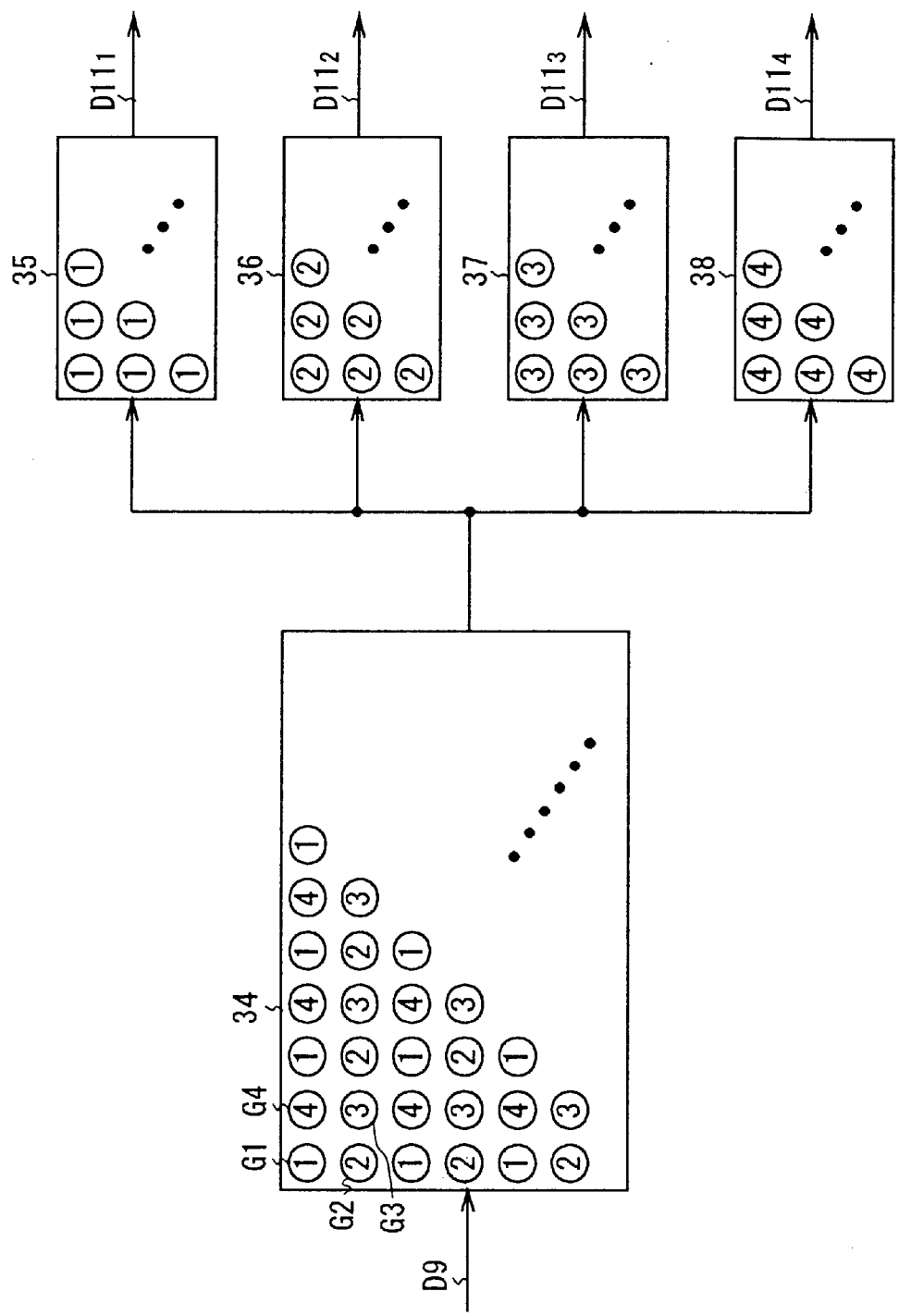
FIG. 4 is a diagrammatic conceptual diagram for explaining the division of still image data.

Then, in the image data division processing part 16, the still image data D9 is sequentially read out from the first frame memory 34 on the basis of a unit of block having two pixels in the horizontal direction and two lines in the vertical direction in accordance with the regulations of the "H. 261 Annex D" under the control of the control part 5, as illustrated in FIG. 4. Further, four of first to fourth pixel data G1 to G4 thus read on the basis of a unit of block are written in second to fifth frame memories 35 to 38 having the storage capacity respectively corresponding to the first image format so as to be cyclically divided thereto.

As described above, in the image data division processing part 16, while the still image data in the second image format is rewritten from the first frame memory 34 to the second to fifth frame memories 35 to 38, they can be divided into four, first to fourth split still image data $D11_1$ to $D11_4$ with an image size corresponding to that in the first image format.

Further, in the image data division processing part 16, while the connection of the switch 39A of a third switching unit 39 is sequentially switched to first to fourth contacts 39B to 39E under the control of the control part 5, the first to fourth split still image data $D11_1$ to $D11_4$ is sequentially read out from the second to fifth frame memories 35 to 38 and the first to fourth split still image data $D11_1$ to $D11_4$ which are thus read are transmitted to the coding part 17 sequentially through the third switching unit 39 and the second switching unit 32.

(3) Detail Configuration of Coding Part 17

Figure 5:
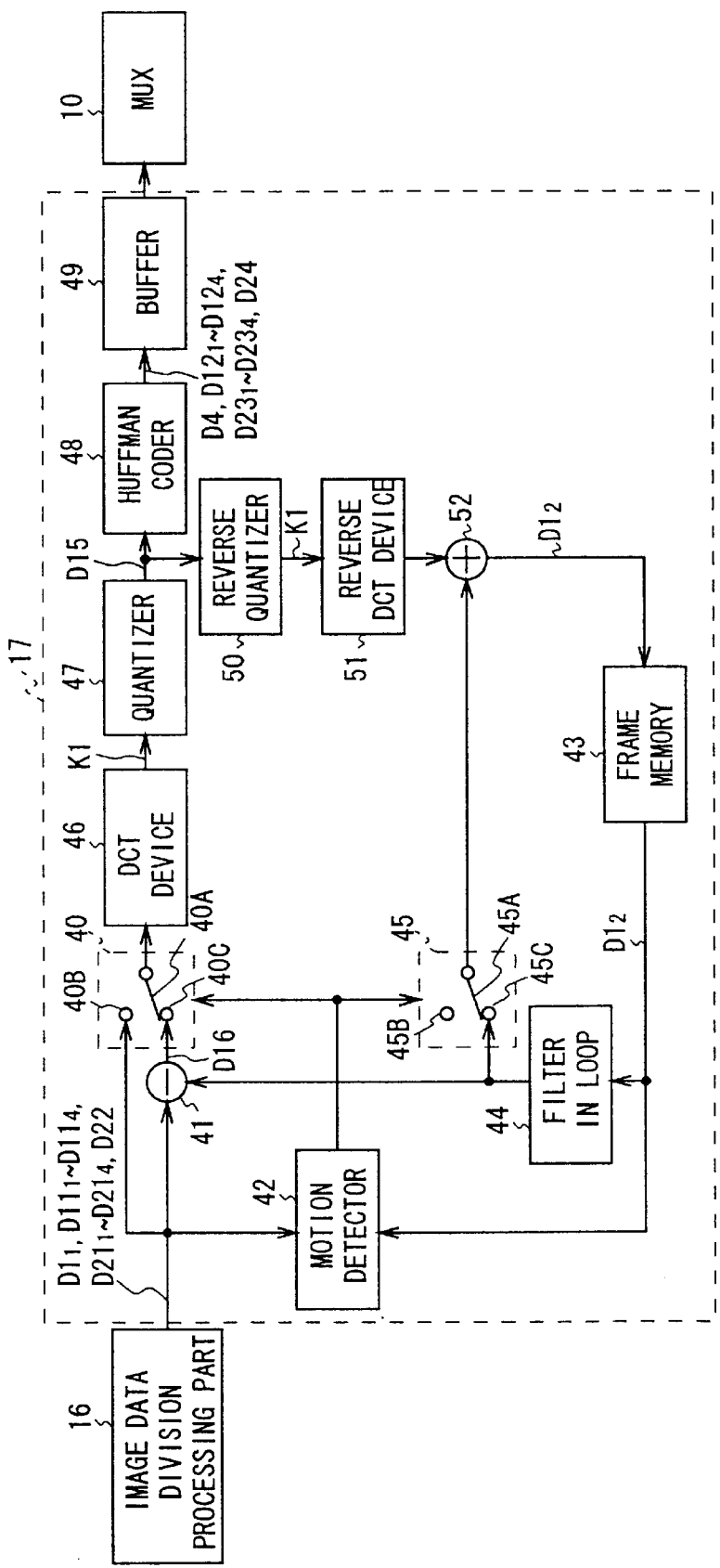
FIG. 5 is a block diagram showing the circuit configuration of a coding part.

In the coding part 17, as shown in FIG. 5, the first moving image data D1 supplied from the image data division processing part 16, in first transmission processing mode, is taken on the basis of a unit of frame sequentially into a first switching unit 40, a subtracter 41 and a motion detector 42.

In this case, when the motion detector 42 takes the first moving image data for one frame (referred to as first frame moving image data, hereinafter) $D1_1$ which is supplied from the image data division processing part 16, it reads from a frame memory 43 the first moving image data (referred to as second frame moving image data, hereinafter) $D1_2$ prior by one frame in terms of time to the first frame moving image data $D1_1$. Then, the motion detector 42 takes in the second frame moving image data $D1_2$ which is thus read, removes distortion generated upon quantization processing through a filter 44 in a loop and supplies the obtained second frame moving image data to a second switching unit 45 and the subtracter 41.

The motion detector 42 sequentially compares these corresponding first and second frame moving image data $D1_1$ and $D1_2$ with each other on the basis of a unit of macroblock which matches to 16 pixels in the horizontal direction and 16 lines in the vertical direction. As coding processing for the first frame moving image data $D1_1$ on the basis of the result of the comparison, either inner-frame coding processing or inter-frame coding processing is selected.

In this case, when the motion detector 42 selects the inner-frame coding processing, it shifts into an intra-mode and respectively connects the switches 40A and 45A of the first and second switching units 40 and 45 to first contacts 40B and 45B. When the motion detector 42 selects the inter-frame coding processing, it shifts to an inter-mode and connects respectively the switches 40A and 45A of the first and second switching units 40 and 45 to second contacts 40C and 45C.

Thus, in the coding part 17, the first frame moving image data $D1_1$ supplied from the image data division processing part 16, in intra-mode, is taken into a discrete cosine transformer (DCT) 46 through the first switching unit 40. In the discrete cosine transformer 46, discrete cosine transformation processing is applied to the first frame moving image data $D1_1$ to send the obtained discrete cosine transformation coefficient K1 to a quantizer 47.

The quantizer 47 applies quantization processing based on a prescribed quantization step to the discrete cosine transformation coefficient K1 supplied from the discrete cosine transformer 46 and transmits obtained quantized data D15 to a Huffman coder 48.

The Huffman coder 48 applies variable-length coding processing to the quantized data D15 supplied from the quantizer 47 and stores moving image information representing the moving image data and intra-mode information in the header part of obtained coded moving image data D4. Then, the Huffman coder 48 transmits the information to the multiplexer 10 through a buffer 49.

At the same time, the quantized data D15 is supplied to a reverse quantizer 50 from the quantizer 47. The reverse quantizer 50 applies reverse quantization processing based on a corresponding quantization step to the quantized data D15 and transmits the obtained discrete cosine transformation coefficient K1 to a reverse discrete cosine transformer 51.

Then, the reverse discrete cosine transformer 51 applies reverse discrete cosine transformation processing to the discrete cosine transformation coefficient K1 supplied from the reverse quantizer 50 to obtain the first original frame moving image data $D1_1$ and transmits the frame moving image data $D1_1$ to the frame memory 43 through an adder 52 as the second frame moving image data $D1_2$. Thus, the second frame moving image data $D1_2$ in the frame memory 43 is rewritten.

Further, in the coding part 17, in inter-mode, the first frame moving image data $D1_1$ supplied from the image data division processing part 16 is taken into the subtracter 41. In the subtracter 41, the first frame moving image data $D1_1$ and the corresponding second frame moving image data $D1_2$ read from the frame memory 43 undergo subtraction processing and the subtracted result which is thus acquired is sent as difference data D16 to the discrete cosine transformer 46 through the first switching unit 40.

After that, in the coding part 17, coding processing is applied to the difference data D16 in a similar manner to that performed at the time of the intra-mode. Thus, in the Huffman coder 48, moving image information and intra-mode information are stored in the header part of the coded moving image data D4 which is thus formed. Then, these pieces of information are transmitted to the multiplexer 10 through the buffer 49.

Further, the reverse discrete cosine transformer 51 applies the reverse discrete cosine transformation processing to the discrete cosine transformation coefficient K1 supplied from the reverse quantizer 50 at this time to obtain the original difference data D16 and transmits the difference data D16 to the adder 52.

The adder 52 adds the difference data D16 supplied from the reverse discrete cosine transformer 51 to the corresponding second frame moving image data $D1_2$ supplied from the frame memory 43 through the second switching unit 45 in order to generate the original first frame moving image data $D1_1$ and transmits the frame moving image data D1 as the second frame moving image data $D1_2$ to the frame memory 43. Thus, the second frame moving image data $D1_2$ in the frame memory 43 is rewritten.

In the coding part 17, in second transmission processing mode, coding processing similar to that performed during the above first transmission processing mode is applied to the first to fourth split still image data $D11_1$ to $D11_4$ which are sequentially supplied from the image data division processing part 16. Thus, in the Huffman coder 48, identification information for indicating which of the pixel data G1 to G4 in the still image data D9 is used and corresponding intra-mode information or inter-mode information are respectively stored in the header part of the first to fourth coded split still image data $D12_1$ to $D12_4$ which are thus formed. Then, these pieces of information are transmitted to the multiplexer 10 through the buffer 49.

(4) Detail Configuration of Decoding Part 26

Figure 6:
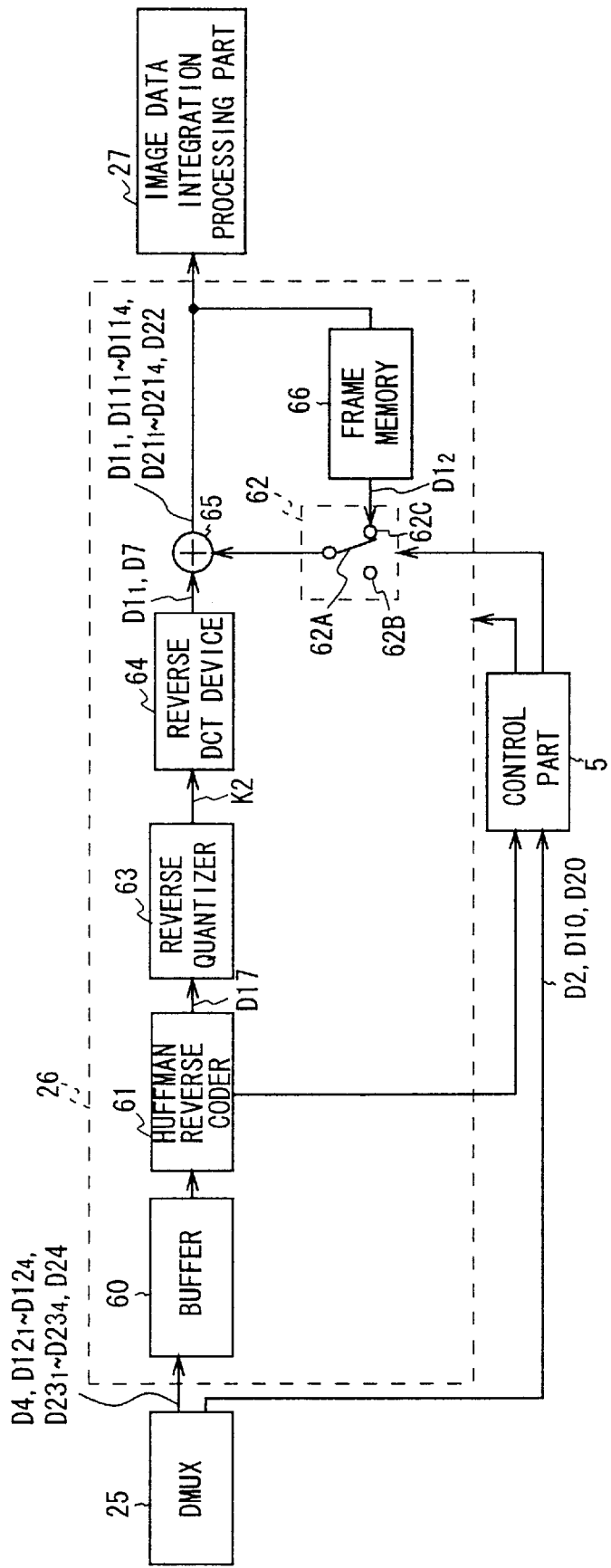
FIG. 6 is a block diagram showing the circuit configuration of a decoding part.

In the decoding part 26, as illustrated in FIG. 6, the coded moving image data D4 supplied from the demultiplexer 25 in first reception processing mode is takes into a Huffman reverse coder 61 through a buffer 60.

When the Huffman reverse coder 61 takes in the coded moving image data D4, it takes out the moving image information, the intra-mode information or the inter-mode information stored in the header part of the coded moving image data D4 and transmits them to the control part 5.

When the intra-mode information is given to the control part 5 from the Huffman reverse coder 61, the control part 5 connects the switch 62A of the first switching unit 62 in the decoding part 26 to a first contact 62B to have an off state and controls the decoding part 26 in accordance with the intra-mode.

Further, when the inter-mode information is supplied to the control part 5 from the Huffman reverse coder 61, the control part 5 connects the switch 62A of the first switching unit 62 to a second contact 62C to have an on state and controls the decoding part 26 in accordance with the inter-mode.

In practice, the Huffman reverse coder 61 decodes the coded moving image data D4 taken therein through the buffer 60 in intra-mode on the basis of a corresponding decoding mode, and transmits obtained quantized data D17 to a reverse quantizer 63.

The reverse quantizer 63 applies reverse quantization processing based on a corresponding quantization step to the quantized data D17 supplied from the Huffman reverse coder 61 and sends the obtained discrete cosine transformation coefficient K2 to a reverse discrete cosine transformer 64.

Then, the reverse discrete cosine transformer 64 applies reverse discrete cosine transformation processing to the discrete cosine transformation coefficient K2 supplied from the reverse quantizer 63 to generate the original first frame moving image data $D1_1$ and transmits the first frame moving image data to the image data integration processing part 27 through an adder 65.

Further, the reverse discrete cosine transformer 64 transmits the first frame moving image data $D1_1$ as the second frame moving image data $D1_2$ at this time to a frame memory 66 so that it rewrites the second frame moving image data $D1_2$ in the frame memory 66.

On the other hand, in the decoding part 26, similar processing to that performed at the time of the intra-mode is sequentially applied, in inter-mode, to the coded moving image data D4 taken in through the buffer 60, so that the original difference data D16 is generated in the reverse discrete cosine transformer 64 and transmitted to the adder 65.

At this time, the control part 5 reads out from the frame memory 66 the second frame moving image data $D1_2$ prior by one frame in terms of time which corresponds to the difference data D16, and supplies the read second frame moving image data $D1_2$ to the adder 65 through the first switching unit 62.

Thus, the adder 65 adds the difference data D16 supplied from the reverse discreate cosine transformer 64 to the corresponding second frame moving image data $D1_2$ which is supplied through the first switching unit 62, hence it forms the original first frame moving image data $D1_1$ and transmits the data $D1_1$ to the image data integration processing part 27.

In addition, the adder 65 transmits the first frame moving image data $D1_1$ as the second frame moving image data $D1_2$ to the frame memory 66, so that the second frame moving image data $D1_2$ in the frame memory 66 is rewritten.

Further, in the decoding part 26, the first to fourth coded split still image data $D12_1$ to $D12_4$ sequentially supplied from the demultiplexer 25, in second reception processing mode, is taken into the Huffman reverse coder 61 through the buffer 60. In the Huffman reverse coder 61, the identification information and the intra-mode information or the inter-mode information stored in the header part of the first to fourth coded split still image data $D12_1$ to $D12_4$ are taken out and transmitted to the control part 5.

Then, in the decoding part 26, decoding processing equal to that performed at the time of the above first reception processing mode is applied to the first to fourth coded split still image data $D12_1$ to $D12_4$ under the control of the control part 5, so that the original first to fourth split still image data $D11_1$ to $D11_4$ are formed and sent to the image data integration processing part 27.

(5) Detail Configuration of Image Data Integration Processing Part 27

Figure 7:
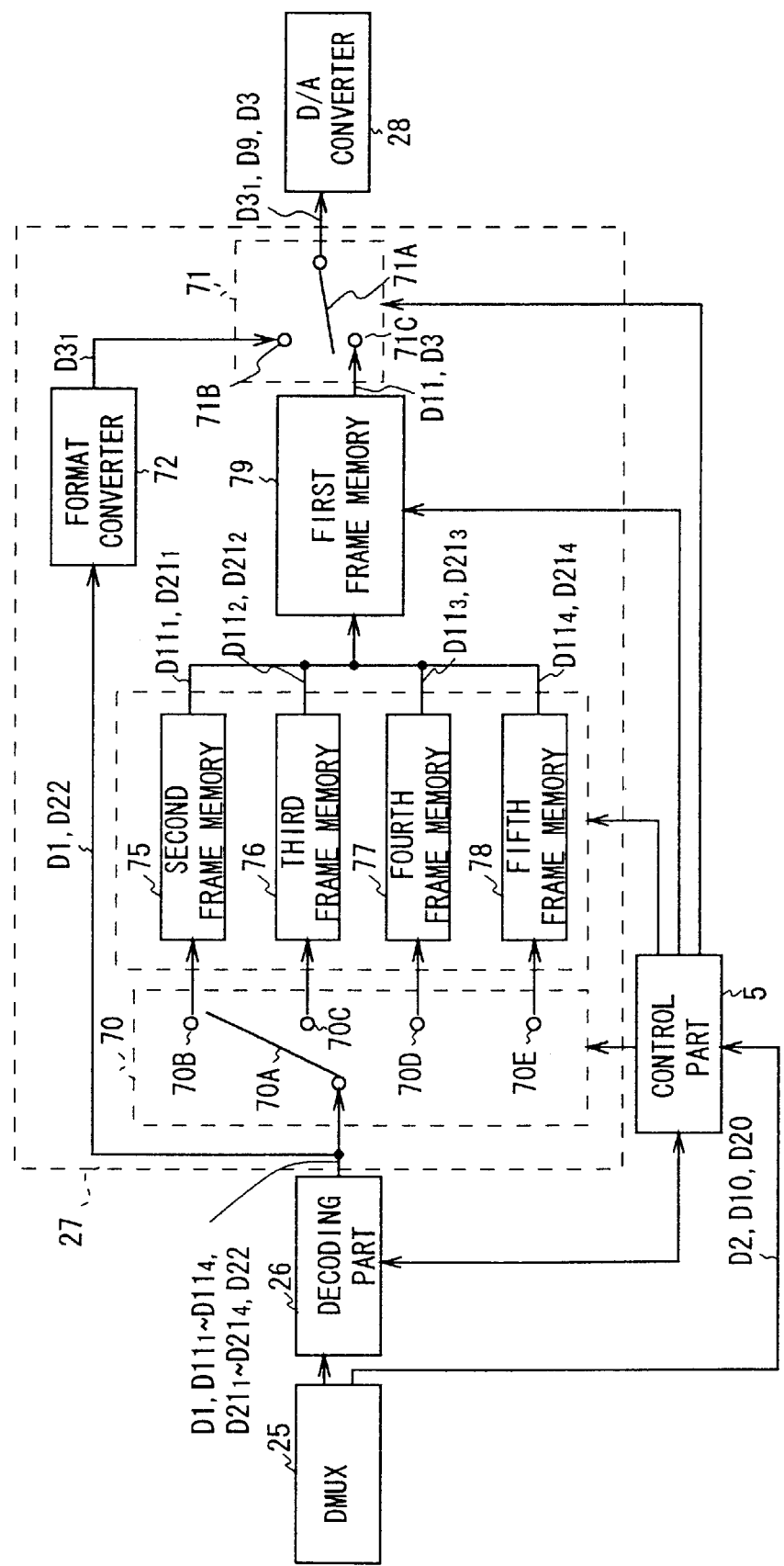
FIG. 7 is a block diagram showing the circuit configuration of an image data integration processing part.

As shown in FIG. 7, in the image data integration processing part 27, the switch 70A of a first switching unit 70 is opened to bring it into an off state under the control of the control part 5 during the first reception processing mode and the switch 71A of a second switching unit 71 is connected to a first contact 71B.

Under this state, in the image data integration processing part 27, the first moving image data D1 sequentially supplied from the decoding part 26 is taken into a format converter 72. In the format converter 72, the first image format of the first moving image data D1 is converted into the second image format. Thus, second moving image data $D3_1$ is obtained and sent to the digital/analog converter 28 through the second switching unit 71.

Further, in the image data integration processing part 27, the connection of the switch 70A in the first switching unit 70 is sequentially switched to first to fourth contacts 70B to 70E under the control of the control part 5 to which the identification information is supplied from the Huffman reverse coder 61, in second reception processing mode, and the switch 71A in the second switching unit 71 is connected to a second contact 71C.

Accordingly, in the image data integration processing part 27, the first to fourth split still image data $D11_1$ to $D11_4$ sequentially supplied from the decoding part 26 are respectively transmitted and written through the first switching unit 70 in second to fifth frame memories 75 to 78 having the storage capacity corresponding to the first image format.

Then, in the image data integration processing part 27, the first to fourth split still image data $D11_1$ to $D11_4$ are sequentially read out from the second to fifth frame memories 75 to 78 under the control of the control part 5. Then, the first to fourth split still image data $D11_1$ to $D11_4$ which are thus read are written in a first frame memory 79 having the storage capacity corresponding to the second image format. Thus, the first to fourth split still image data $D11_1$ to $D11_4$ are integrated in the first frame memory 79 to reproduce the original still image data D9.

Thus, in the image data integration processing part 27, the still image data D9 is read out from the first frame memory 79 and transmitted to the digital/analog converter 28 through the second switching unit 71.

(6) Transmission Processing to Second Moving Image Data D3

In the case of the present embodiment, in addition to the above configuration, when the transmission request information for the second moving image data D3 in the second image format is inputted through the user interface 6 in each terminal unit 2A, 2B (see FIG. 2), the control part 5 shifts into a third transmission processing mode and sends third transmission processing mode information indicating the execution of the third transmission processing mode to the multiplexer 10 as control data D20.

At this time, in the image input and output part 12, the moving image signal S1 generated by the television camera 13 is converted to the second moving image data D3 by the analog/digital converter 14 and the moving image data D3 is transmitted to the image data division processing part 16.

Then, in the image data division processing part 16 (see FIG. 3), the first switching unit 31 is switched to an on state under the control of the control part 5 and the switch 32A in the second switching unit 32 is connected to the second contact 32C.

Thus, in the image data division processing part 16, the second moving image data D3 supplied from the analog/digital converter 14 is sequentially taken into the first frame memory 34 through the first switching unit 31 on the basis of a unit of frame in the same manner as that for the above still image data D9 and the second moving image data D3 for one frame is sequentially written in the first frame memory 34.

Then, in the image data division processing part 16, every time the second moving image data D3 for one frame is written in the first frame memory 34, while the second moving image data D3 for one frame is divided into four pieces of first to fourth moving image data (referred to as first to fourth split moving image data, hereinafter) $D21_1$ to $D21_4$ having an image size corresponding to the first image format and the split moving image data is read from the first frame memory 34 in a similar manner to that performed during the above second transmission processing mode. Then, the first to fourth split moving image data $D21_1$ to $D21_4$ thus read are sent and written in the respectively corresponding second to fifth frame memories 35 to 38.

Further, in the image data division processing part 16, while the connection of the switch 39A in the third switching unit 39 is sequentially switched to the first to fourth contacts 39B to 39E under the control of the control part 5 at this time, the first to fourth split moving image data $D21_1$ to $D21_4$ are read out from the second to fifth frame memories 35 to 38. Then, the first to fourth split moving image data $D21_1$ to $D21_4$ thus read are sequentially transmitted to the coding part 17 through the third switching unit 39 and the second switching unit 32.

In this connection, the "H. 261 Annex D" regulates that the still image data D9 for two or more frames (that is to say, data of one frame having the second image format) should not be successively transmitted.

Therefore, in the image data division processing part 16, every time the first to fourth split moving image data $D21_1$ to $D21_4$ for one frame having the second image format are transmitted to the coding part 17 in accordance with this regulation, for instance, the first split moving image data $D21_1$ out of the transmitted first to fourth split moving image data $D21_1$ to $D21_4$ is read out again from the second frame memory 35. Then, the first split moving image data $D21_1$ which is thus read is transmitted to the coding part 17 as moving image data D22 (referred to as dummy moving image data, hereinafter) having an image size corresponding to the first image format sequentially through the third switching unit 39 and the second switching unit 32.

As described above, in the image data division processing part 16, the first to fourth split moving image data $D21_1$ to $D21_4$ obtained by dividing the second moving image data D3 for one frame and the dummy moving image data D22 are sequentially and alternately sent to the coding part 17.

When the first to fourth split moving image data $D21_1$ to $D21_4$ and the dummy moving image data D22 are supplied to the coding part 17 (see FIG. 5) from the image data division processing part 16, the coding part 17 applies coding processing to the first to fourth split moving image data $D21_1$ to $D21_4$ and the dummy moving image data D22 in a similar manner to that performed during the above first transmission processing mode. Thus, in the Huffman coder 48, first to fourth split moving image coded data $D23_1$ to $D23_4$ and dummy moving image coded data D24 are formed.

Then, the Huffman coder 48 respectively stores identification information representing which of the pixel data G1 to G4 of the second moving image data D3 is used to form these data, and intra-mode information or inter-mode information corresponding thereto in the header parts of the first to fourth split moving image coded data $D23_1$ to $D23_4$ at this time, and then, transmits them to the multiplexer 10 through the buffer 49.

Further, after the Huffman coder 48 stores the moving image information, and the corresponding intra-mode information or the inter-mode information in the header part of the dummy moving image coded data D24, it sends them to the multiplexer 10 through the buffer 49.

Thus, the multiplexer 10 (see FIG. 2) sequentially time-division multiplexes control data D20 supplied from the control part 5 at this time, the coded audio data D6 supplied through the delay circuit 20, the information data D7 supplied from the telematique device part 21 as required and the first to fourth split moving image coded data $D23_1$ to $D23_4$ and the dummy moving image coded data D24 supplied from the coding part 17. Then, the multiplexer 10 transmits the obtained multiplexed data D25 to the other terminal unit 2A or 2B sequentially through the interface circuit 22 and the public network 3.

Thus, in each terminal unit 2A, 2B, the second moving image data D3 in the second image format corresponding to a moving image with high resolution is sequentially subjected to coding processing under the regulation of the "H. 261 Annex D," as described above, so that coded moving image data can be transmitted to the other terminal unit 2A or 2B.

At the same time, in each terminal unit 2A, 2B, the multiplexed data D25 transmitted through the public network 3 from the other terminal unit 2A or 2B, upon receiving the data, is received by the demultiplexer 25 through the interface circuit 22.

Then, the demultiplexer 25 separates the received multiplexed data D25 into the control data D20, the first to fourth split moving image coded data $D23_1$ to $D23_4$ and the dummy moving image coded data D24, the coded audio data D6 and the information data D7. Then, the demultiplexer 25 transmits the control data D20 to the control part 5, the first to fourth split moving image coded data $D23_1$ to $D23_4$ and the dummy moving image coded data D24 to the decoding part 26, the coded audio data D6 to the audio codec 19 through the delay circuit 20, and the information data D7 to the telematique device part 21.

When the control data D20 is supplied to the control part 5 from the demultiplexer 25, the control part 5 shifts to a third reception processing mode in accordance with third transmission processing mode information obtained on the basis of the control data D20 and entirely controls the corresponding terminal unit 2A or 2B in accordance with the third reception processing mode.

Then, in the decoding part 26 (see FIG. 6), the first to fourth split moving coded image data $D23_1$ to $D23_4$ and the dummy moving image coded data D24 supplied from the demultiplexer 25 at this time are taken into the Huffman reverse coder 61 through the buffer 60. In the Huffman reverse coder 61, the identification information and the intra-mode information or the inter-mode information stored in the header parts of the first to fourth split moving image coded data $D23_1$ to $D23_4$ are taken out and these pieces of information are transmitted to the control part 5. Further, the moving image information and the intra-mode information or the inter-mode information stored in the header part of the dummy moving image coded data D24 are taken out and these pieces of information are transmitted to the control part 5.

Further, in the decoding part 26, decoding processing similar to that done during the above first reception processing mode is sequentially applied to the first to fourth split moving image coded data $D23_1$ to $D23_4$ and the dummy moving image coded data D24, so that the original first to fourth split moving image data $D21_1$ to $D21_4$ and the dummy moving image data D22 are formed and these data are transmitted to the image data integration processing part 27.

In the image data integration processing part 27 (see FIG. 7), the switch 71A in the second switching unit 71 is connected to the second contact 71C under the control of the control part 5 which is supplied to the identification information from the decoding part 26. Under this state, the connection of the switch 70A in the first switching unit 70 is sequentially switched to the first to fourth contacts 70B to 70E, and therefore, the first to fourth split moving image data $D21_1$ to $D21_4$ supplied from the decoding part 26 at this time are taken in through the first switching unit 70 and sequentially written in the corresponding second to fifth frame memories 75 to 78.

Then, in the image data integration processing part 27, the first to fourth split moving image data $D21_1$ to $D21_4$ written in the second to fifth frame memories 75 to 78 are sequentially read out, and the first to fourth split moving image data $D21_1$ to $D21_4$ which are thus read are written in the first frame memory 79. In this way, the first to fourth split moving image data $D21_1$ to $D21_4$ are integrated in the first frame memory 79 to reproduce the original second moving image data D3 for one frame.

Further, in the image data integration processing part 27, the first switching unit 70 is switched to bring it into an off state under the control of the control part 5 to which the moving image information is supplied from the decoding part 26, so that the dummy moving image data D22 supplied from the decoding part 26 at this time is sent to the second switching unit 71 through the format converter 72.

Then, in the image data integration processing part 27, the switch 71A in the second switching unit 71 is connected to the second contact 71C under the control of the control part 5, so that the dummy moving image data D22 is discarded.

As mentioned above, in the image data integration processing. part 27, while the dummy moving image data D22 supplied from the decoding part 26 is sequentially discarded, the first to fourth split moving image data $D21_1$ to $D21_4$ are selectively used so that the second moving image data D3 is sequentially reproduced on the basis of a unit of frame in the first frame memory 79. Then, the second moving image data D3 which is thus reproduced is sequentially read from the first frame memory 79 and the read moving image data is transmitted to the digital/analog converter 28 through the second switching unit 71.

Thereby, the digital/analog converter 28 sequentially applies analog/digital conversion processing to the second moving image data D3 which is sequentially supplied on the basis of a unit of frame from the image data integration processing part 27. Then, the digital/analog converter 28 sends the moving image signal S5 in the second image format which is thus obtained to the monitor 29. In this way, a moving image with high resolution based on the moving image signal S5 can be displayed on the monitor 29.

(7) Operation and Effects of the Present Embodiment

Figure 8:
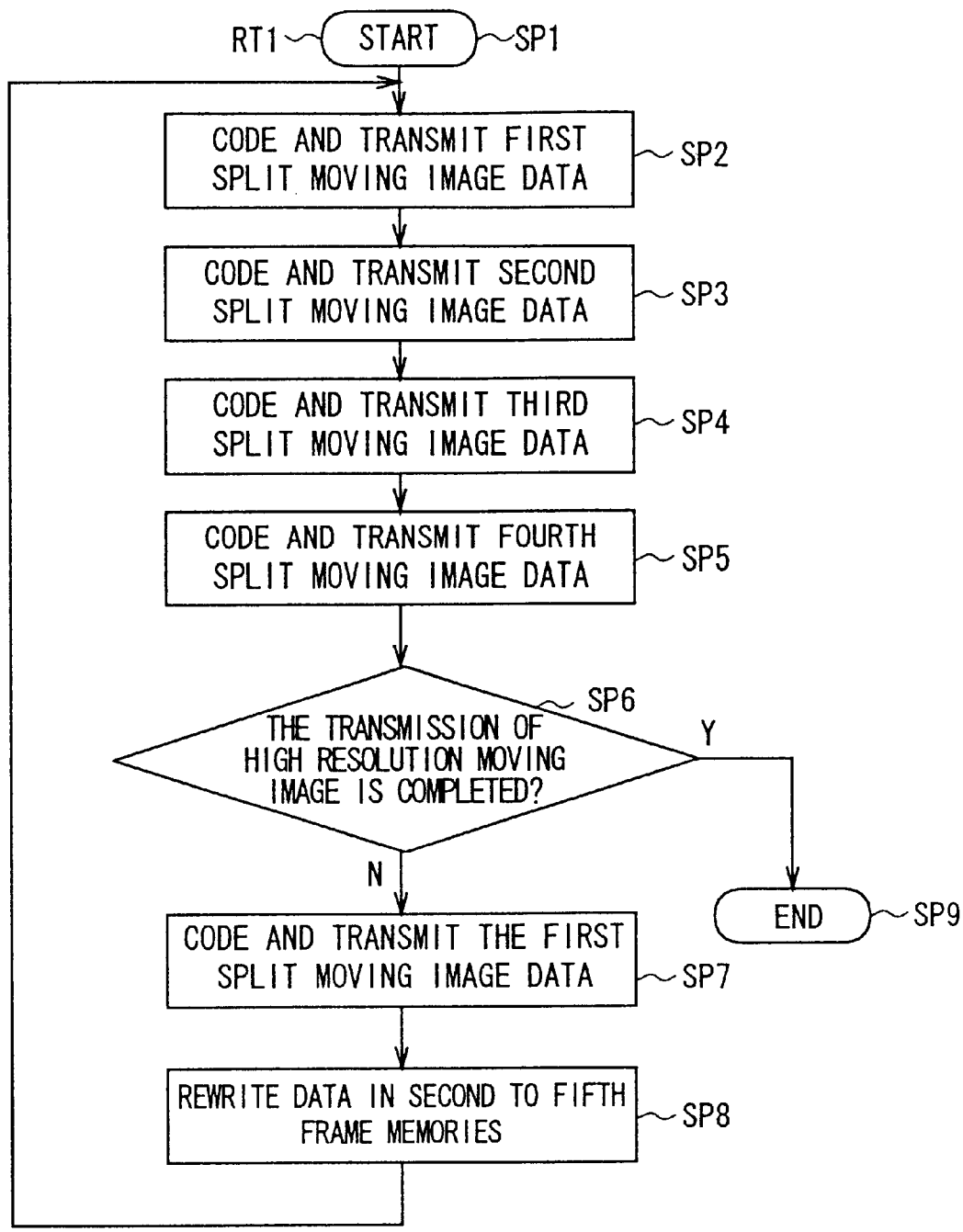
FIG. 8 is a flowchart showing a procedure for transmitting high resolution moving image data.

In the video conference system 1 with the above described configuration, at the time of the third transmission processing mode of the control part 5 in the terminal units 2A and 2B, a transmission procedure RT1 of moving image data with high resolution shown in FIG. 8 starts in step SP1. In next step SP2, the second moving image data D3 is rewritten to the second to fifth frame memories 35 to 38 from the first frame memory 34 so as to be sequentially divided into the first to fourth split moving image data $D21_1$ to $D21_4$.

Then, the control part 5 reads out the first split moving image data $D21_1$ from the second frame memory 35, applies coding processing to the first split moving image data $D21_1$ which is thus read through the coding part 17, and then, transmits the first split moving image coded data to the other terminal unit 2A, 2B sequentially through the multiplexer 10, the interface circuit 22 and the public network 3.

Next, the control part 5 advances to step SP3 to read out the second split moving image data $D21_2$ from the third frame memory 36, applies coding processing to the second split moving image data through the coding part 17 and then transmits the coded second split moving image data to the other terminal unit 2A, 2B sequentially through the multiplexer 10, the interface circuit 22 and the public network 3.

Subsequently, the control part 5 advances to step SP4 to read out the third split moving image data $D21_3$ from the fourth frame memory 37, codes the third split moving image data in the coding part 17 and then transmits the split moving image coded data to the other terminal unit 2A, 2B sequentially through the multiplexer 10, the interface circuit 22 and the public network 3.

Then, the control part 5 advances to step SP5 to read out the fourth split moving image data $D21_4$ from the fifth frame memory 38, applies coding processing to the fourth split moving image data which is thus read through the coding part 17, and then sends the coded fourth split moving image data to other terminal units 2A and 2B sequentially through the multiplexer 10, the interface circuit 22 and the public network 3.

Next, the control part 5 advances to step SP6 to decide whether or not the completion request of transmission processing for the second moving image data D3 is inputted through the user interface 6.

At this time, when the control part 5 obtains a negative result in step SP6, the control part 5 advances to a subsequent step SP7 to read out the first split moving image data $D21_1$ from the second frame memory 35 as the dummy moving image data D22, applies coding processing to the dummy moving data through the coding part 17 and then transmits the split moving image coded data to the other terminal unit 2A, 2B sequentially through the multiplexer 10, the interface circuit 22 and the public network 3.

After that, the control part 5 advances to step SP8 to rewrite the second moving image data D3 for one frame in the first frame memory 34 to the second moving image data D3 for next one frame in terms of time. Then, the control part 5 divides the second moving image data D3 thus rewritten into the first to fourth split moving image data $D21_1$ to $D21_4$ and writes them in the second to fifth frame memories 35 to 38 respectively corresponding thereto.

Under this state, the control part 5 returns to step SP2 and repeats the process of steps SP2, SP3, SP4, SP5, SP6, SP7, SP8 and SP2 until it gains an affirmative result in step SP6.

In such a way, the control part 5 sequentially divides the second moving image data D3 into the first to fourth split moving image data $D21_1$ to $D21_4$ on the basis of a unit of frame, sequentially and alternately codes the first to fourth split moving image data $D21_1$ to $D21_4$ for one frame of the second moving image data D3 and the dummy moving image data D22 and transmits these image data. Then, as a result of input of the completion request of transmission processing for the second moving image data D3 through the user interface 6, when an affirmative result is obtained in step SP6, the transmission processing for the second moving image data D3 is completed. The control part 5 advances to step SP9 to finish the transmission procedure RT1 of the high resolution moving image data.

In the meantime, in each terminal unit 2A, 2B of the video conference system 1, the second moving image data D3 transmitted through the public network 3 from the other terminal unit 2A, 2B, upon receiving of the data, is received by the demultiplexer 25 through the interface circuit 22.

Then, in the terminal unit 2A, 2B, the multiplexed data D25 is divided into the control data D20, the first to fourth split moving image coded data $D23_1$ to $D23_4$ and the dummy moving image data D24 in the demultiplexer 25. Then, the control data D20 obtained by dividing the multiplexed data is transmitted to the control part 5, so that the control part 5 shifts to the third reception processing mode on the basis of the control data D20.

Under this state, in the terminal unit 2A, 2B, the first to fourth split moving image coded data $D23_1$ to $D23_4$ and the dummy moving image data D24 acquired on the basis of the multiplexed data D25 are sequentially decoded by the decoding part 26. The first to fourth split moving image data $D21_1$ to $D21_4$ and the dummy moving image data D 22 which are thus obtained are sequentially and alternately transmitted to the image data integration processing part 27.

Then, in the terminal unit 2A, 2B, while the dummy moving image data D22 is sequentially discarded in the image data integration processing part 27, the first to fourth split moving image data $D21_1$ to $D21_4$ are selectively employed so that the original second moving image data D3 for one frame is sequentially reproduced and the reproduced second moving image data D3 is sent to the digital/analog converter 28.

Therefore, according to the video conference system 1, since the second moving image data D3 in the second image format is divided into the first to fourth split moving image data $D21_1$ to $D21_4$ with an image size corresponding to that in the first image format and these split moving image data are transmitted, in third transmission processing mode, in the terminal units 2A and 2B, the resolution of the second moving image data D3 can be prevented from deteriorating from converting the second image format into the first image format.

Further, in the video conference system 1, since the first to fourth split moving image data $D21_1$ to $D21_4$ obtained by dividing the second moving image data D3 for one frame and the dummy moving image data D22 are sequentially and alternately transmitted, in third transmission processing mode, in the terminal unit 2A, 2B, the second moving image data D3 can be transmitted while the resolution thereof is prevented from lowering from processing operation substantially similar to a case in which the second transmission processing mode and the first transmission processing mode are repeated sequentially and alternately. Therefore, the second moving image data D3 with high resolution can be transmitted with ease in accordance with the regulations of the "H. 261 Annex D" without providing an extra circuit.

Further, in this video conference system 1, since the first to fourth split moving image data $D21_1$ to $D21_4$ are selectively employed to reproduce the second moving image data D3, while the dummy moving image data D22 is sequentially discarded, in third reception processing mode, in each terminal unit 2A, 2B, the second moving image data D3 can be received under processing operation apparently and substantially equal to a case in which the first reception processing mode and the second reception processing mode are repeated sequentially and alternately. Therefore, the second moving image data D3 with high resolution can easily be received in accordance with the regulations of the "H. 261 Annex D" without providing an extra circuit.

According to the above-described configuration, in the terminal units 2A and 2B, the second moving image data D2 is sequentially divided into the first to fourth split moving image data $D21_1$ to $D21_4$ on the basis of a unit of frame, the first to fourth split moving image data $D21_1$ to $D21_4$ and the dummy moving image data D22 are sequentially and alternately coded and the first to fourth split moving image coded data $D23_1$ to $D23_4$ and the dummy moving image coded data D24 which are thus obtained are transmitted. Further, when the first to fourth split moving image coded data $D23_1$ to $D23_4$ and the dummy moving image coded data D24 which are transmitted as described above are received, the decoding processing is applied to the first to fourth split moving image coded data $D23_1$ to $D23_4$ and the dummy moving image coded data D24 which are thus received and the first to fourth split moving image data $D21_1$ to $D21_4$ are selectively used to sequentially reproduce the second moving image data D3 for one frame, while the obtained dummy moving image data D22 is sequentially discarded. In this way, the second moving image data D3 can be transmitted and received with ease in accordance with the regulations of the "H. 261 Annex D" without converting the second image format of the second moving image data D3 into the first image format. Accordingly, it is possible to provide a video conference system in which the moving image data with higher resolution than that of moving image data specified by prescribed coding and decoding modes can be transmitted and received.

(8) Other Embodiments

In the above described embodiment, although the present invention is applied to the two terminal units 2A and 2B in the video conference system 1 shown in FIG. 1, it should be noted that present invention is not limited thereto, and can widely be applied to other various kinds of transmitters and receivers to which the coding and decoding modes standardized on the basis of the "H. 261 Annex D", such as a plurality of terminal units of a video conference system using a multispot controller, a plurality of terminal units of the video conference system constructed by sequentially connecting a plurality of terminal units in subordination through public network and a plurality of terminal units of a visual telephone system.

Further, in the above embodiment, in the image data division processing part 16 of each terminal unit 2A, 2B the second moving image data D3 (and still image data D9) written in the first frame memory 34 is divided into the first to fourth split moving image data $D21_1$ to $D21_4$ (and first to fourth split still image data $D11_1$ to $D11_4$) through the second to fifth frame memories 35 to 38. However, the present invention is not limited thereto. The second moving image data D3 (and still image data D9) can be read from the first frame memory 34, and simultaneously divided into the first to fourth split moving image data $D21_1$ to $D21_4$ (and first to fourth split still image data $D11_1$ to $D11_4$) and they can be transmitted directly to the coding part 17 through the second switching unit 32. Thus, it is possible to make the configuration of the image data division processing part 16 simpler.

Further, in the above embodiment, in the image data integration processing part 27 of the respective terminal unit 2A and 2B, the first to fourth split moving image data $D21_1$ to $D21_4$ (and first to fourth split still image data $D11_1$ to $D11_4$) supplied from the decoding part 26 are written in the first frame memory 79 through the corresponding second to fifth frame memories 75 to 78 respectively to reproduce the original second moving image data D3 (and still image data D9). However, it should be noted that the present invention is not limited thereto, and the original second moving image data D3 (and still image data D9) can be reproduced while the first to fourth split moving image data $D21_1$ to $D21_4$ (and first to fourth split still image data $D11_1$ to $D11_4$) supplied from the decoding part 26 are sequentially written directly in the first frame memory 79. As a consequence, the configuration of the image data integration processing part 27 can be simplified.

In addition, in the above described embodiment, the still image data D9 to be transmitted is formed by the television camera 13 in each terminal unit 2A, 2B. However, the present invention is not limited thereto and the still image data D9 can be obtained by a variety of other methods. For instance, the still image data D9 is previously formed and it is externally supplied to the image input and output part 12 of each terminal unit 2A, 2B, or the still image data D9 is previously recorded in a prescribed recording medium, it can be reproduced from the recording medium, and then, the reproduced still image data is supplied to the image input and output part 12.

Further, in the above embodiment, although the first to fourth split moving image data $D21_1$ to $D21_4$ and the dummy moving image data D22 composed of the first split moving image data $D21_1$ are sequentially and alternately transmitted to the coding part 17, in third transmission processing mode, in each terminal unit 2A, 2B, it should be noted that the present invention is not limited thereto. And the first to fourth split moving image data $D21_1$ to $D21_4$ and the dummy moving image data D22 for at least one frame with an image size corresponding to that in the first image format can be sequentially and alternately transmitted to the coding part 17.

In this case, as the dummy moving image data D22, it is possible to use various kinds of other data with an image size corresponding to that in the first image format, such as the second to fourth split moving image data $D21_2$ to $D21_4$ as well as the first split moving image data $D21_1$, or the first moving image data D1 for at least one frame having an image size corresponding to that in the first image format, etc.

Still further, in the above embodiment, although the image data division processing part 16 in each terminal unit 2A, 2B is provided with one first frame memory 34 and four second to fifth frame memories 35 to 38. However, the present invention is not limited thereto. A plurality of first frame memories 34 and second to fifth frame memories 35 to 38 can be provided so as to make data processing speed in the image data division processing part 16 much higher.

Furthermore, in the above-described embodiment, although one first frame memory 79 and four second to fifth frame memories 75 to 78 are provided in the image data integration processing part 27 in each terminal unit 2A, 2B. However, the present invention is not limited thereto. A plurality of first frame memories 79 and second to fifth frame memories 75 to 78 can be provided so as to make data processing speed in the image data integration processing part 27 much higher.

As stated above, according to the present invention, there is provided a transmitter for coding the first moving image data in a prescribed first image format with a prescribed coding mode and transmitting the moving image coded data, dividing the still image data in a second image format having a larger image size than that in the first image format into a plurality of split still image data with an image size corresponding to that in the first image format, and then, subjecting the split still image data is to the coding processing and transmitting the split still image coded data. This transmitter comprises: moving image data dividing means for sequentially dividing the second moving image data in the second image format into a plurality of split moving image data with an image size corresponding to that in the first image format on the basis of unit of frame, and sequentially and alternately outputting the split moving image data for one frame out of the second moving image data and the dummy moving image data for at least one frame with an image size corresponding to that in the first image format; and coding means for coding the split moving image data and the dummy moving image data outputted from the moving image data dividing unit. Therefore, the second moving image data can be transmitted with ease in accordance with the prescribed coding mode without converting the second image format of the second moving image data into the first image format. Consequently, it is possible to provide a transmitter that can transmit the moving image data with higher resolution than that of the moving image data specified in accordance with the prescribed coding and decoding modes.

There is provided a receiver for receiving and decoding with a relevant decoding mode first moving image data and each split still image data coded by and transmitted from the transmitter which codes and transmits the first moving image in a prescribed first image format with a prescribed coding mode, divides still image data in a second image format having a larger image size than that in the first image format into a plurality of split still image data with an image size corresponding to that in the first image format, subjects split still image data to coding processing and transmits coded split still image data. This receiver comprises: receiving means for receiving split moving image data and dummy moving image data, which are obtained after second moving image data in the second image format is sequentially divided on the basis of unit of frame into a plurality of split moving image data with an image size corresponding to that in the first image format, and the split moving image data for one frame out of the second moving image data for at least one frame with an image size corresponding to that in the first image format are sequentially and alternately coded by and transmitted from the transmitter; decoding means for decoding each coded split moving image data and the coded dummy moving image data which are received by the receiving unit and sequentially and alternately outputting each split moving image data and the dummy moving image data which are thus obtained; moving image means integrating unit for selectively using and integrating each split moving image data out of each split moving image data and the dummy moving image data which are outputted from the decoding unit so as to reproduce the second moving image data. In this way, the second moving image data transmitted from the transmitter in accordance with the prescribed coding mode without converting the second image format into the first image format can be received and processed with ease. Accordingly, it is possible to provide a receiver which can receive the moving image data with higher resolution than that of the moving image data specified in accordance with the prescribed coding and decoding modes.

Further, there is provided a transmitting method for coding the first moving image data in a prescribed first image format with a prescribed coding mode and transmitting the coded moving image data, dividing the still image data in a second image format having a larger image size than that in the first image format into a plurality of split still image data with an image size corresponding to that in the first image format, and then, subjecting the split still image data to the coding processing and transmitting the coded split still image data. This transmitting method comprises: a first step of sequentially dividing the second moving image data in the second image format into a plurality of split moving image data with an image size corresponding to that in the first image format on the basis of unit of frame, and sequentially and alternately outputting each split moving image data for one frame in the second moving image data and the dummy moving image data for at least one frame with an image size corresponding to that in the first image format; and a second step of coding each split moving image data and the dummy moving image data outputted in the first step. In this is way, the second moving image data can easily be transmitted in accordance with the prescribed coding mode without converting the second image format of the second moving image data into the first image format. Accordingly, it is possible to provide a transmitting method which enables transmission of the moving image data with higher resolution than that of the moving image data specified by the prescribed coding and decoding modes.

Further, there is provided a receiving method for receiving and decoding with a relevant decoding mode first moving image data and each split still image data coded by and transmitted from the transmitter which codes and transmits the first moving image in a prescribed first image format with a prescribed coding mode, divides still image data in a second image format having a larger image size than that in the first image format into a plurality of split still image data with an image size corresponding to that in the first image format, subjects split still image data to coding processing and transmits coded split still image data. The receiving method comprises:

- a first step of receiving split moving image data and dummy moving image data which are obtained, after second moving image data in the second image format is sequentially divided on the basis of unit of frame into a plurality of split moving image data with an image size corresponding to that in the first image format, and the split moving image data for one frame out of the second moving image data for at least one frame with an image size corresponding to that in the first image format are sequentially and alternately coded by and transmitted from the transmitter;
- a second step of applying the decoding processing to each coded split moving image data and the coded dummy moving image data which are received in the first step, then sequentially and alternately outputting each split moving image data and the dummy moving image data which are thus obtained; and
- a third step of selectively using and integrating the split moving image data from the split moving image data and the dummy moving image data which are outputted in the second step to reproduce the second moving image data. In this way, the second moving image data transmitted from the transmitter in accordance with the prescribed coding mode without converting the second image format into the first image format can be received and processed with ease. Accordingly, it is possible to provide a receiving method which enables reception of the moving image data with higher resolution than that of the moving image data specified by the prescribed coding and decoding modes.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitter for coding first moving image data in a prescribed first image format with a prescribed coding mode to yield coded moving image data and transmitting the coded moving image data, dividing still image data in a second image format having a larger image size than that in the first image format into a plurality of split still image data with an image size corresponding to that in the first image format, and then, subjecting the split still image data to coding processing to yield coded split still image data and transmitting the coded split still image data, said transmitter comprising:

moving image data dividing means for sequentially dividing second moving image data in the second image format into a plurality of split moving image data with an image size corresponding to that in the first image format on the basis of unit of frame, and sequentially alternately outputting split moving image date for one frame out of the second moving image data and dummy moving image data for at least one frame with an image size corresponding to that in the first image format; and coding means for coding each split moving image data and the dummy moving image data outputted from said moving image data dividing means.

2. The tramsmitter according to claim 1, wherein
said coding mode is a coding mode which is standardized on the basis of an advice "H.261 Annex D" by the international telecommuniaction union-telecommunication standardization sector (ITU-T).

3. The transmitter according to claim 1, wherein said coding mode is a videoconferencing coding mode.

4. A receiver for receiving and decoding with a relevant decoding mode first moving image data and each split still image data coded by and transmitted from a transmitter which codes and transmits said first moving image in a prescribed first image format with a prescribed coding mode, divides still image data in a second image format having a larger image size than that in said first image format into a plurality of split still image data with an image size corresponding to that in said first image format, subjects split still image data to coding processing and transmits coded split still image data, said receiver comprising:

receiving means for receiving split moving image date and dummy moving image data which are obtained, after second moving image data in said second image format is sequentially divided on the basis of unit of frame into a plurality of split moving image data with an image size corresponding To that in said first image format, and said split moving image data for one frame out of said second moving image data for at least one frame with an image size corresponding to that in said first image format are sequentially and alternately coded by and transmitted from said transmitter;

decoding means for decoding each split moving image coded data and dummy moving image coded data which are received by a receiving unit and sequentially and alternately outputting each split moving image data and the dummy moving image data which are thus obtained; and moving image data integrating means for selectively using and integrating the split moving image data of the split moving image data and the dummy moving image data which are outputted from the decoding unit to reproduce the second moving image data.

5. The receiver according to claim 4, wherein said coding mode and said decoding mode are a coding mode and a decoding mode which are standardized on the basis of an advice "H. 261 Annex D" by the international telecommunication union-telecommunication standardization sector (ITU-T).

6. The receiver according to claim 4, further comprising:

moving image data dividing means for sequentially dividing the second moving image data into the split moving image data on the basis of unit of a frame and sequentially and alternately outputting split moving image data for one frame out of the second moving image data and the dummy moving image data for at least one frame;

coding means for applying coding processing to the split moving image data and the dummy moving image data which are outputted from the moving image data dividing means and outputting the split moving image coded data and the dummy moving image data; and transmitting means for transmitting each split moving image data and the dummy moving image data which are subjected to coding processing and outputted from the coding means.

7. The receiver according to claim 4, wherein said coding mode is a videoconferencing coding mode and said decoding mode is a videoconferencing decoding mode.

8. A transmitting method for coding first moving image data in a prescribed first image format with a prescribed coding mode to yield coded moving image data and transmitting the coded moving image data, dividing still image data in a second image format having a larger image size than that in the first image format into a plurality of split still image data with an image size corresponding to that in the first image format, and then, subjecting the split still image data to the coding processing to yield coded split still image data and transmitting the coded split still image data, said transmitting method comprising:

a first step of sequentially dividing second moving image data in the second image format into a plurality of split moving image data with an image size corresponding to that in the first image format on the basis of unit of frame, and sequentially and alternately outputting split moving image data for one frame out of the second moving image data and dummy moving image data for at least one frame with an image size corresponding to that in the first image format; and a second step of coding each split moving image data and the dummy moving image data outputted in the first step.

9. The transmitting method according to claim 8, wherein said coding mode is a coding mode which is standardized on the basis of an advice "H. 261 Annex D" by the international telecommunication union-telecommunication standardization sector (ITU-T).

10. The transmitting method according to claim 8, wherein said coding mode is a videoconferencing coding mode.

11. A receiving method for receiving and decoding with a relevant decoding mode first moving image data and each split still image data coded by and transmitted from a transmitter which codes and transmits said first moving image in a prescribed first image format with a prescribed coding mode, divides still image data in a second image format having a larger image size than that in said first image format into a plurality of split still image data with an image size corresponding to that in said first image format, subjects split still image data to coding processing and transmits coded split still image data, said receiving method comprising:

a first step of receiving split moving image data and dummy moving image data, which are obtained after second moving image data in said second image format is sequentially divided on the basis of unit of frame into a plurality of split moving image data with an image size corresponding to that in said first image format, and said split moving image data for one frame out of said second moving image data for at least one frame with an image size corresponding to that in said first image format are sequentially and alternately coded by and transmitted from said transmitter;

a second step of applying decoding processing to each split moving image data and the dummy moving image data which are thus coded and which are received in the first step and sequentially and alternately outputting each split moving image data and the dummy moving image data which are thus obtained; and a third step of selectively using and integrating the split moving image data and the dummy moving image data which are outputted in the second step to reproduce the second moving image data.

12. The receiving method according to claim 11, wherein said coding mode and said decoding mode are a coding mode and a decoding mode which are standardized on the basis of an advice "H. 261 Annex D" by the international telecommunication union-telecommunication standardization sector (ITU-T).

13. The receiving method according to claim 11, further comprising:

a fourth step of sequentially dividing the second moving image data into the split moving image data on the basis of unit of a frame and sequentially and alternately outputting split moving image data for one frame out of the second moving image data and the dummy moving image data for at least one frame;

a fifth step for applying coding processing to the split moving image data and the dummy moving image data which are outputted in the fourth step and outputting the split moving image coded data and the dummy moving image data; and a sixth step for transmitting the split moving image data and the dummy moving image data which are subjected to coding processing and outputted in the fifth step.

14. The receiving method according to claim 11, wherein said coding mode is a videoconferencing coding mode and said decoding mode is a videoconferencing decoding mode.

* * * * *